United States Patent [19]

Nomura

[11] Patent Number: 5,461,682
[45] Date of Patent: Oct. 24, 1995

[54] IMAGE FILING APPARATUS PROVIDING IMAGE DATA SUITABLE FOR SEVERAL INPUT/OUTPUT DEVICES

[75] Inventor: Keiichi Nomura, Kawasaki, Japan

[73] Assignee: Ricoh Company Ltd., Tokyo, Japan

[21] Appl. No.: 48,275

[22] Filed: Apr. 14, 1993

[30] Foreign Application Priority Data

Apr. 20, 1992 [JP] Japan ................................. 4-128110

[51] Int. Cl.[6] ........................... G06K 9/36; H04N 1/41
[52] U.S. Cl. ..................... 382/232; 358/403; 358/430; 358/432
[58] Field of Search ................. 382/56; 358/426, 358/430, 403, 432, 433, 451; 345/202; 395/114, 934; H04N 1/41

[56] References Cited

U.S. PATENT DOCUMENTS

| | | | |
|---|---|---|---|
| 4,939,583 | 7/1990 | Tsuboi et al. | 358/261.1 |
| 5,038,389 | 8/1991 | Mizuno | 382/56 |
| 5,091,782 | 2/1992 | Krause et al. | 358/135 |
| 5,187,755 | 2/1993 | Aragaki | 382/56 |
| 5,300,949 | 4/1994 | Rodriquez et al. | 345/202 |
| 5,307,163 | 4/1994 | Hatano et al. | 348/415 |

*Primary Examiner*—David K. Moore
*Assistant Examiner*—Andrew W. Johns
*Attorney, Agent, or Firm*—Cooper & Dunham

[57] ABSTRACT

An image filing apparatus according to the invention comprises a unit for inputting an image, a plurality of data compressing and extending units each for compressing the input image data to store the compressed image data and each for extending the compressed image data to output the extended image data to at least one of image outputting units such as an image display, an image printer and the like, and a control unit for selecting one of the plurality of data compressing and extending units in accordance with an image type of the input image to supply it to the selected data compressing and extending unit upon the compression and for supplying the compressed image data to the selected data compressing and extending unit upon the extension. Thus, the optimum compressing and extending method is selected and applied to the input image data in accordance with the type of the image outputting unit from which the image data is to be output.

14 Claims, 16 Drawing Sheets

TARGET BLOCK FOR JUDGMENT

| (0,0) | (1,0) | (2,0) | (3,0) | (4,0) | (5,0) | (6,0) | (7,0) |
|---|---|---|---|---|---|---|---|
| (0,1) | (1,1) | (2,1) | (3,1) | (4,1) | (5,1) | (6,1) | (7,1) |
| (0,2) | (1,2) | ①(2,2) | (3,2) | (4,2) | (5,2) | (6,2) | (7,2) |
| (0,3) | (1,3) | (2,3) | ②(3,3) | (4,3) | (5,3) | (6,3) | (7,3) |
| (0,4) | (1,4) | (2,4) | (3,4) | ③(4,4) | (5,4) | (6,4) | (7,4) |
| (0,5) | (1,5) | (2,5) | (3,5) | (4,5) | ④(5,5) | (6,5) | (7,5) |
| (0,6) | (1,6) | (2,6) | (3,6) | (4,6) | (5,6) | ⑤(6,6) | (7,6) |
| (0,7) | (1,7) | (2,7) | (3,7) | (4,7) | (5,7) | (6,7) | (7,7) |

IMAGE FILING APPARATUS PROVIDING IMAGE DATA SUITABLE FOR SEVERAL INPUT/OUTPUT DEVICES

BACKGROUND OF THE INVENTION

1. Field of the Invention

The present invention relates to the improvement of an image filing apparatus such as an optical disk, or an electronic filing apparatus, and more particularly to an image filing apparatus providing image data suitable for output types of several input/output devices.

2. Description of the Related Art

Generally, a scanner, a printer and a CRT are used mainly as input/output devices in such an image filing apparatus.

There are many types of methods of displaying a tone image in use for these input/output devices. For example, the binary method and the multi value method are applied widely for the scanner. In the printer, the binary method is used mainly, especially for the laser printer, the binary method and the area tone method are applied widely. In addition, there are many methods such as the binary method, the multi value method and the color method for the CRT. Thus, many types of methods of displaying a tone image are available for input/output devices.

Conventionally, image data processed by such a method (the binary method, the multi value method or the color method) are compressed and extended using a standard data compression and extension method. For example, the method (MH, MR, or MMR) using the Huffman coding is well known for the compressing and extending process of binary image data. Recently, a method referred to as arithmetic coding has been used widely. In the compressing and extending process multi-valued image data or color image data, generally, two-dimensional orthogonal transforming method called as Adaptive Discrete Cosine Transform (ADCT) is used widely. Thus, there are several data compression and extension methods according to types of input/output devices.

Usually, an image forming apparatus is provided with a plurality of input/output devices, For example, a printer, a scanner, a CRT and the like. As mentioned above, the binary method is most widely used for a printer. Therefore, a transformation from a multi value to a binary value is performed on data input through the scanner in an image processing unit of the apparatus. Further, the display using binary data must be used for the CRT in accordance with the outputting type of the printer. The result is that there is a decrease of the CRT's power of expression caused by the decrease of the amount of information.

SUMMARY OF THE INVENTION

It is therefore an object of the present invention to provide an image filing apparatus including a plurality of processing units corresponding to types of compressing and extending methods, respectively, in which one optimum processing unit is selected according to the type of an assigned I/O device thereby to output image data in the output form of the assigned I/O device such as an image display, an image printer or the like.

The object of the invention, as will appear from a reading of the following specification, is achieved by an image filing apparatus comprising a unit for inputting an image, a plurality of data compressing and extending units each for compressing the input image data to store the compressed image data and each for extending the compressed image data to output the extended image data to at least one of image outputting units such as an image display, an image printer and the like, and a control unit for selecting one of the plurality of data compressing and extending units in accordance with an image type of the input image to supply it to the selected data compressing and extending unit upon the compression and for supplying the compressed image data to the selected data compressing and extending unit upon the extension.

In operation, when compressing the input image data, the control unit selects one of the plurality of data compressing and extending units in accordance with an image type of the input image. Preferably, the control unit comprises a unit for determining an image type of the input image using the input image data and an array of DCT (diacrete cosine transform) coefficients. Thus, the optimum compressing and extending method is selected and applied to the input image data in accordance with the type of the image outputting unit from which the image data is to be output.

The object of the invention is also achieved by an image filing apparatus comprising a unit for inputting an image, a data compressing unit for compressing the input image to store the compressed image data, a unit for extending the compressed image data to output the extended data to at least one of image outputting units such as an image display, an image printer and the like, and a unit for determining an image type of an area of the extended image data using the extended image data and DCT coefficients in the area thereby to supply the extended image data in the area, on which a predetermined image processing is performed according to the image type, to at least one of image outputting units.

When extending the compressed image data, that is the coded and compressed image data is reconstructed, the determining unit determines an image type of the compressed image data in areas using the extended and decoded image data and DCT coefficients in areas. Preferably, a plurality of predetermined image processings are performed on the decoded image data in an area according to the image type and one of them is selected and output to one of the image outputting units.

Further, the object of the invention is attained by providing an image filing apparatus comprising an unit for inputting an image, a plurality of data compressing and extending units for compressing the input image data to store a plurality of compressed data and for extending the plurality of compressed data to output the extended data to at least one of outputting units such as an image display, an image printer and the like, respectively, and a control unit for selecting one of the plurality of compressed data in accordance with a type of the image outputting unit from which the compressed image is to be output to supply the selected data to the corresponding data compressing and extending unit upon the extension and thereby to output the extended data to the image outputting unit.

Further objects and advantages of the present invention will be apparent from the following description of the preferred embodiments of the invention as illustrated in the accompanying drawings,

Figure 13A:
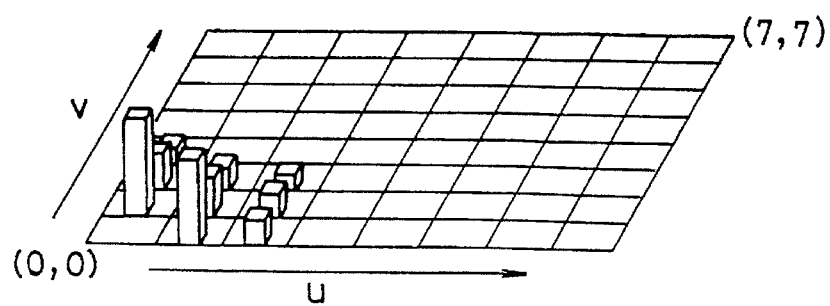
FIG. 13a shows mean magnitudes as for an image including an intermediate tone area.
Figure 13B:
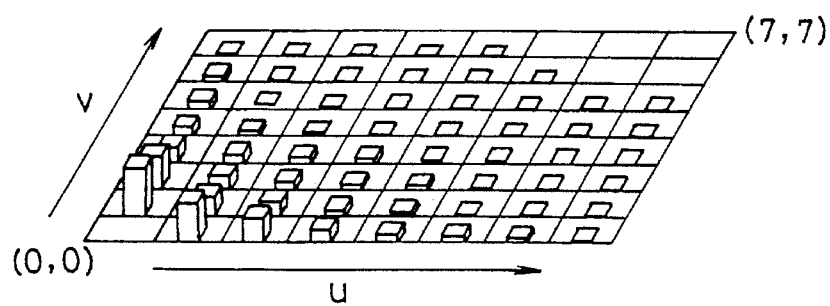
FIG. 13b shows mean magnitudes as for an image including characters.
Figure 13C:
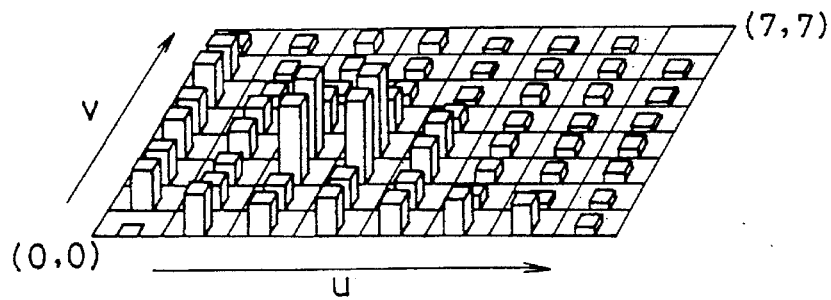
Figure 13D:
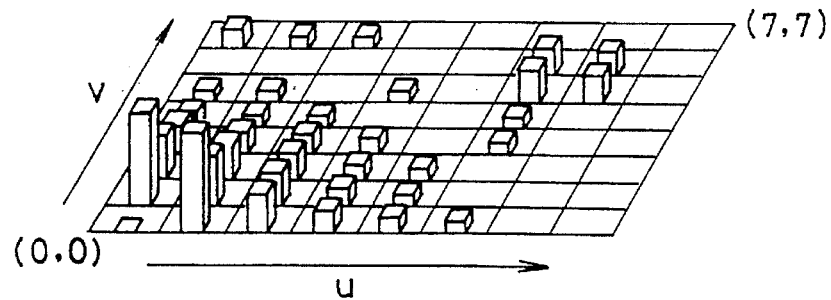
Figures 14, 15:
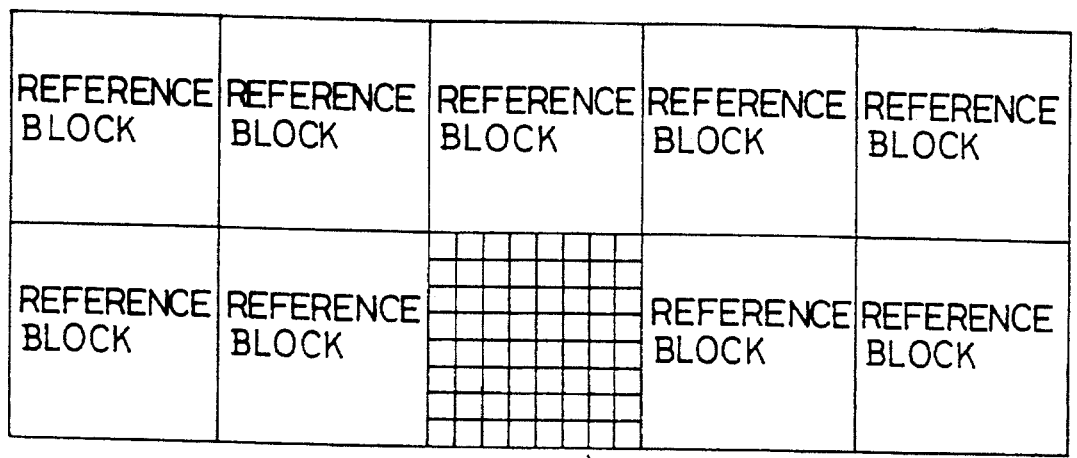
Figure 16:
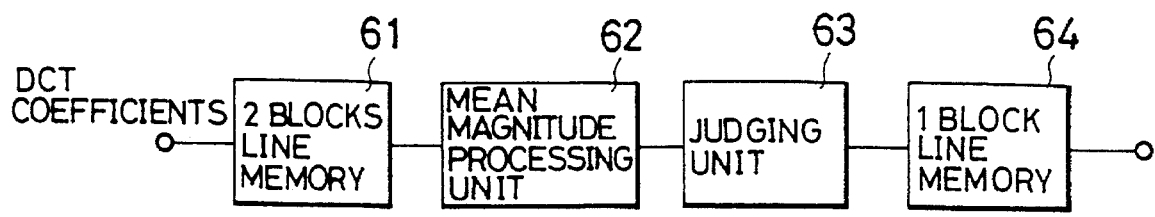
Figure 17:
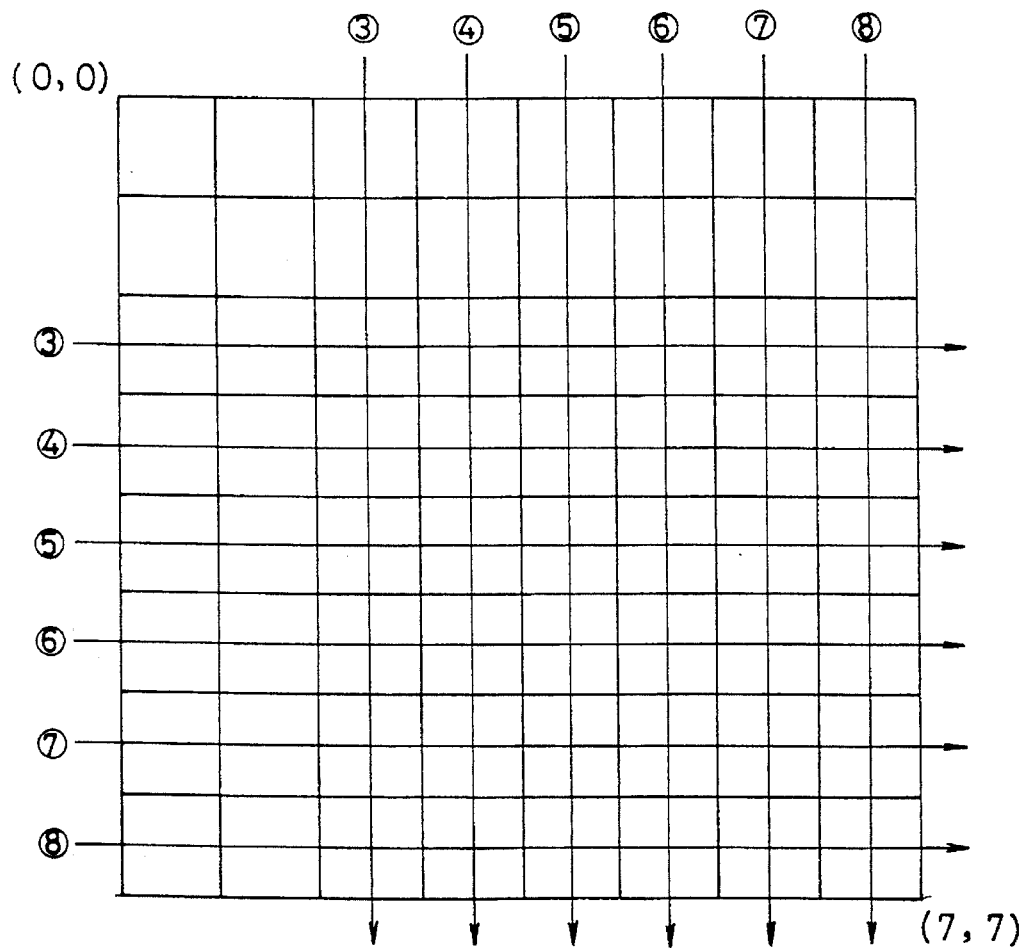
Figure 18A:
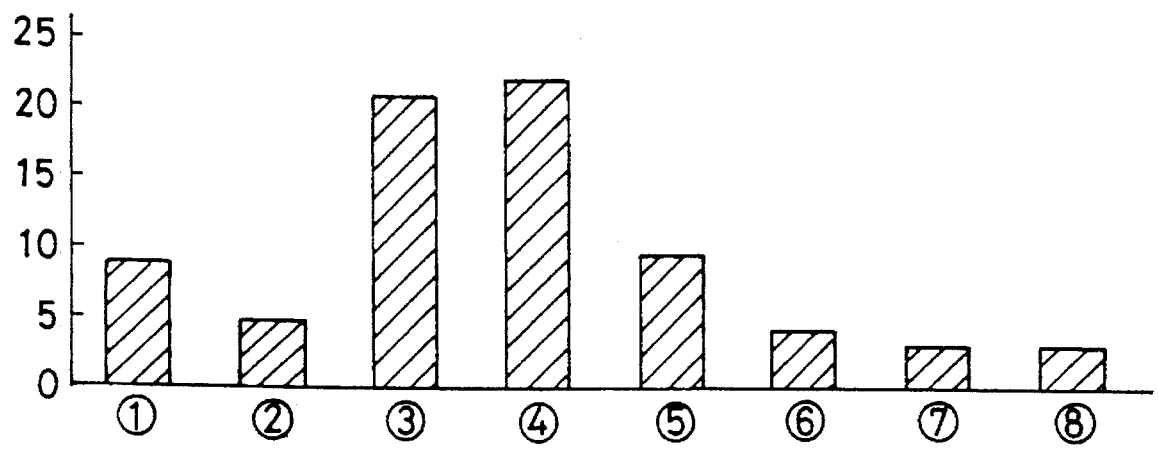
Figure 18B:
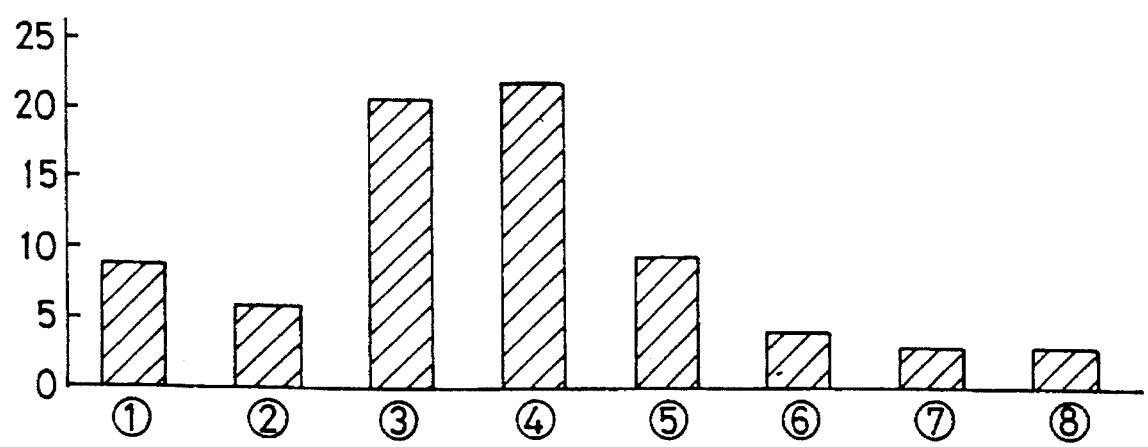
Figure 19:
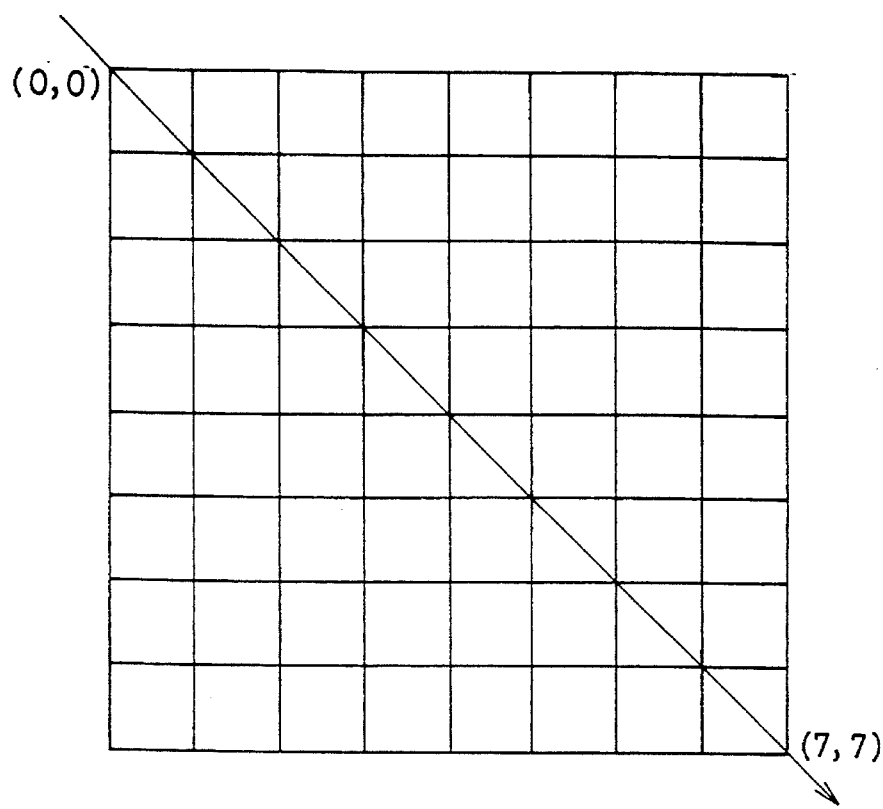
Figure 20:
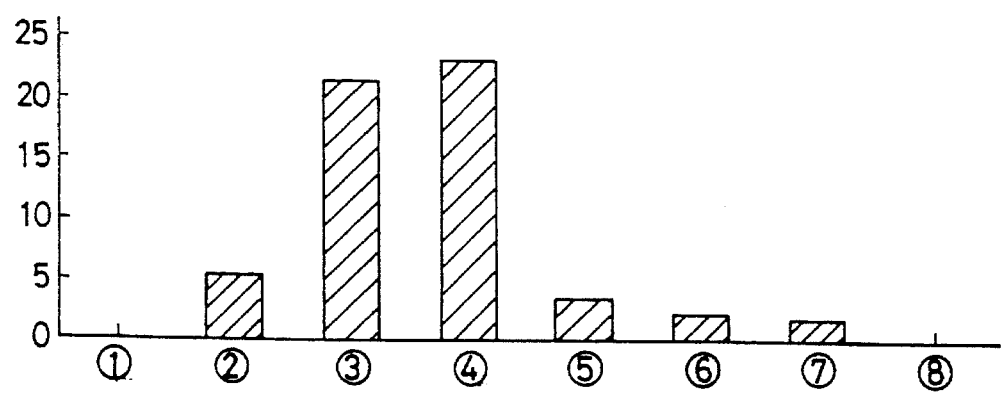

Fig, 13c shows mean magnitudes as for the image including meshes of 100 lines which is read by a scanner with 400 dpi;

FIG. 13d shows mean magnitudes as for the image including meshes of 200 lines which is read by a scanner with 400 dpi;

FIG. 14 shows the relationship between the target block for the judgment and reference blocks:

FIG. 15 shows an example of divided areas of DCT coefficients in use for the judgment of an image area with meshes:

FIG. 16 shows a partially block diagram of an example of the judging unit 54 for an image area with meshes:

FIG. 17 shows an example of a scanning method in use for the judgment of a peak located in the oblique direction of a matrix in the judging unit 54;

FIG. 18a shows the mean magnitudes arranged in the third line of the u direction of FIG. 13c;

FIG. 18b shows the mean magnitudes arranged in the third line of the v direction;

FIG. 19 shows another example of a scanning method in use for the judgment of a peak located in the oblique direction of the matrix in the judging unit 54; and FIG. 20 shows mean magnitudes of moduli of the AC components in the oblique direction of an array of DCT coefficients.

DESCRIPTION OF THE PREFERRED EMBODIMENTS

Figure 1:
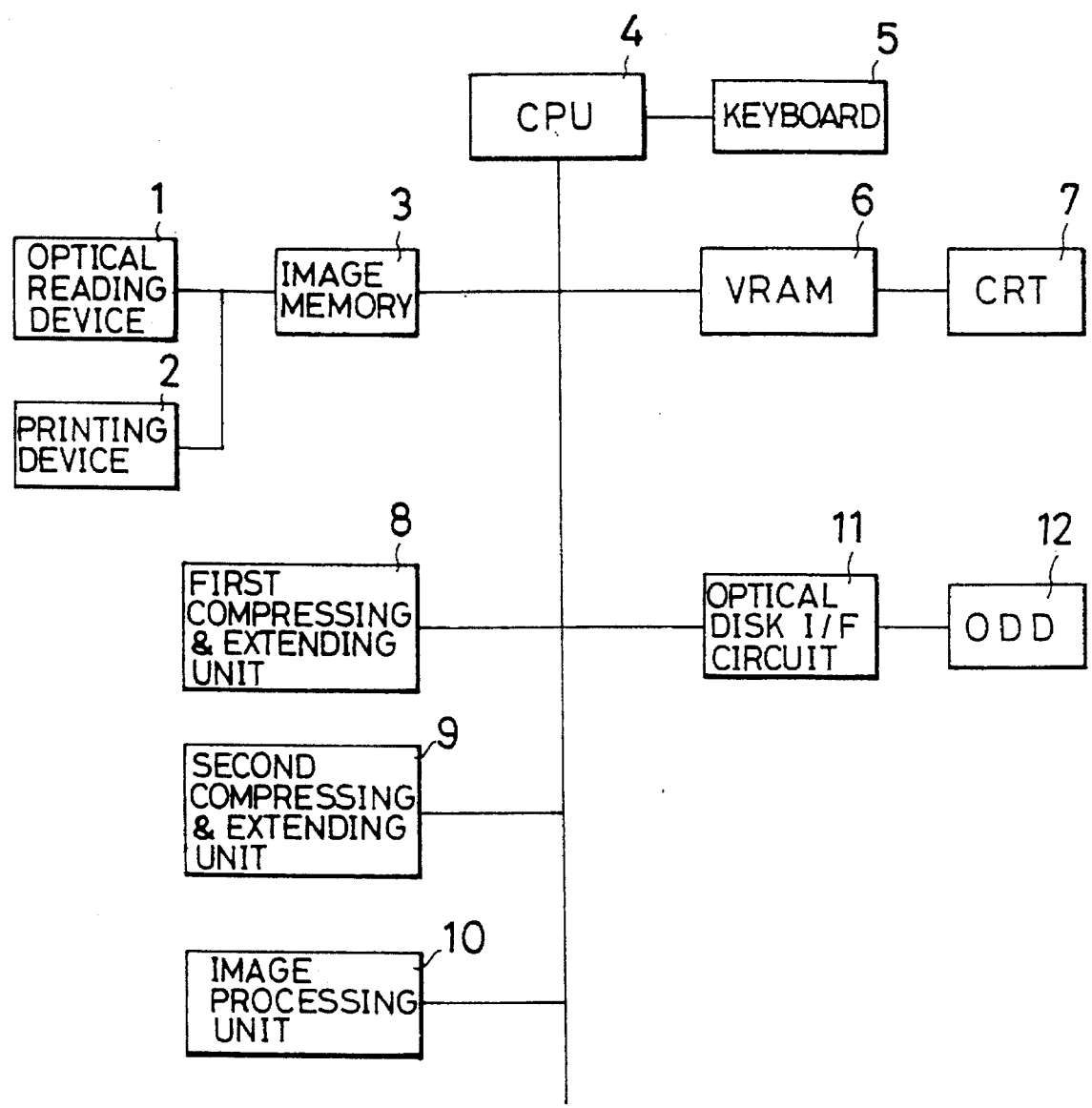
FIG. 1 shows a block diagram of an embodiment of an image filing apparatus according to the present invention.

FIG. 1 shows a block diagram of an embodiment of an image filing apparatus according to the present invention. In FIG. 1, reference numeral 1 denotes an optical reading device; 2, a printing device; 3, an image memory; 4, a CPU; 5, a keyboard; 6, a memory for display; 7, a CRT; 8, a first compressing and extending unit; 9, a second compressing and extending unit; 10, an image processing unit; 11, an optical disk I/F circuit; and 12, an optical disk drive device.

The filing apparatus according to the first embodiment is provided with a plurality of compressing and extending units, that is the first and second compressing and extending units 8 and 9 which constitute the image data compressing and extending device of the apparatus as shown in FIG. 1. Additionally, the apparatus is characterized in that the CPU 4 is adapted to control the compressing operation of image data and the extending operation of the compressed data for a display or print operation.

The other constructions and operations are similar to those of a conventional filing apparatus. The optical reading device 1 (for example, a scanner) has a function for reading an original document having characters, drawings or the like. The image memory 3 is a memory for storing image data read by the reading device 1. That is, the memory functions as an image storage unit.

The first compressing and extending unit 8 functions as one image data compressing and extending unit for compressing and extending image data using one compressing and extending method which is suitable for the CRT 7, for example the DCT method.

The second compressing and extending unit 9 functions as the other image data compressing and extending unit for compressing and extending image data using another compressing and extending method which is suitable for the printing device 2, for example the Huffman coding method.

Further, the CRT 7 and the memory for display (for example VRAM) are integral parts of an image display unit for outputting image data and the printing device 2 is an image printing unit for outputting image data.

The CPU 4 has a function for controlling the whole image filing apparatus. The image processing unit 10 has a function for processing image information in the apparatus. The optical disk drive device 12 is a processing device comprising an optical disk for storing document files and a driving unit for driving the optical disk.

Figure 2:
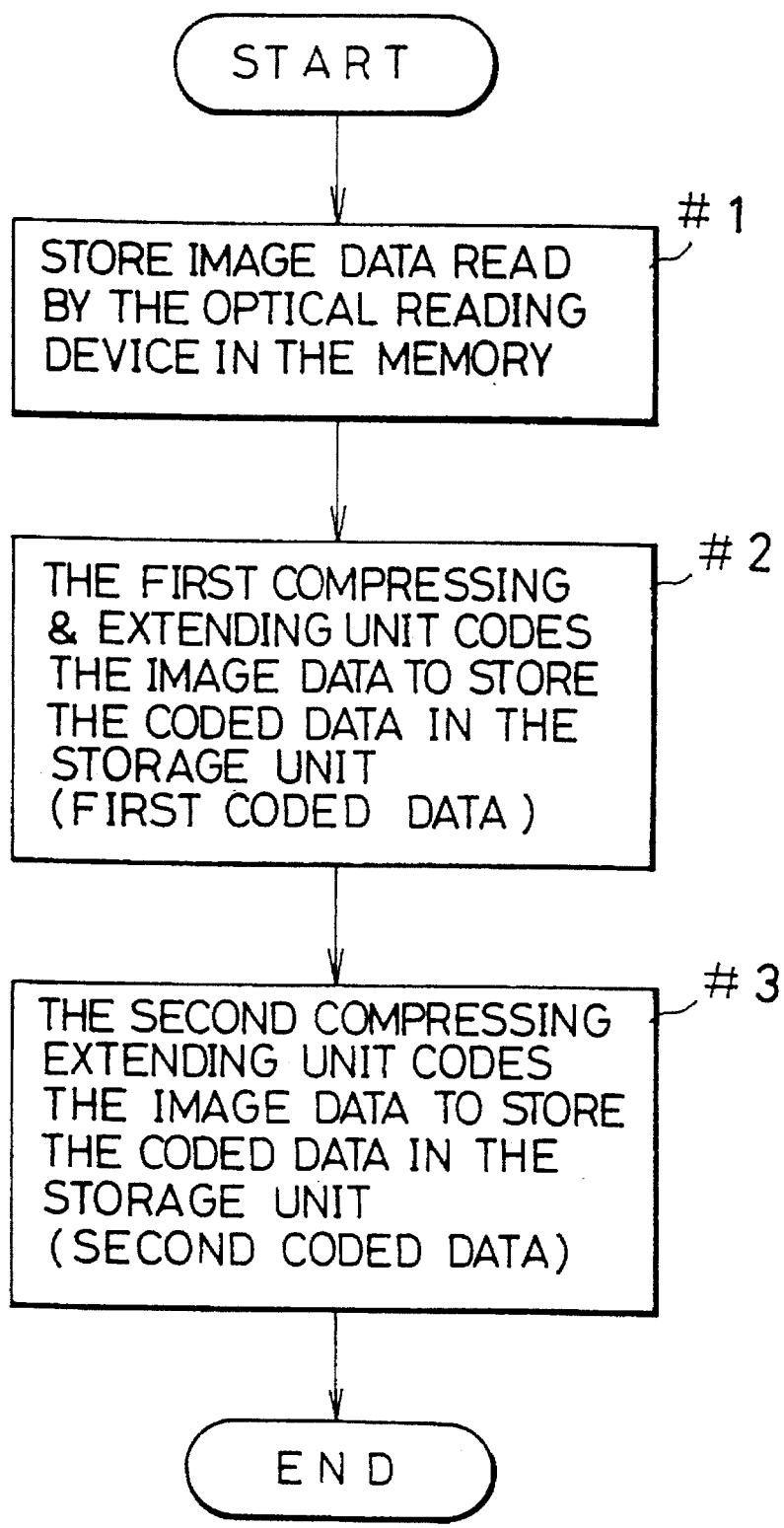
FIG. 2 shows a flowchart diagram representing a flow of a main process upon the compression in the image filing device according to the invention.
Figure 3:
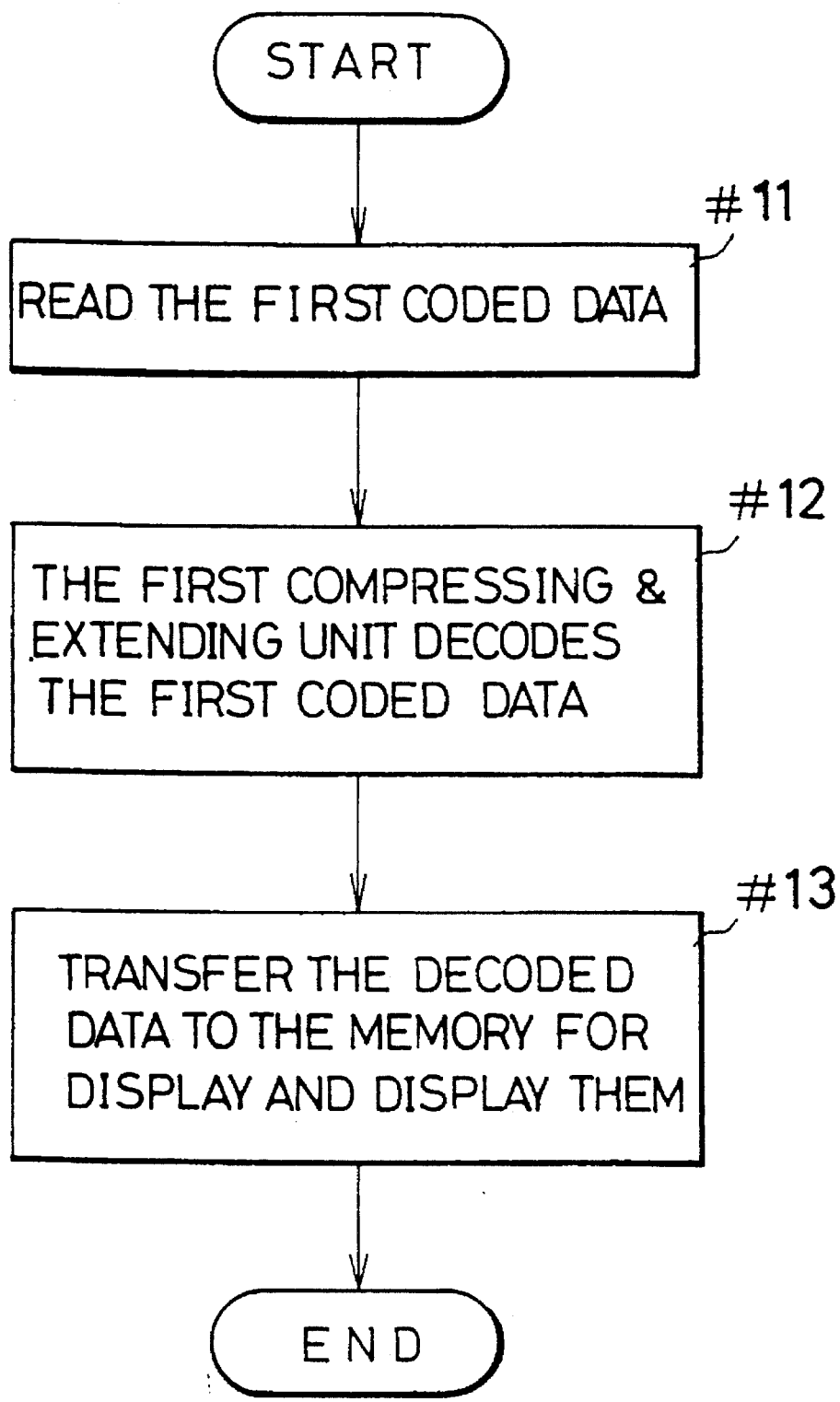
FIG. 3 shows a flowchart diagram representing a flow of a main process upon the extending operation for display in the filing apparatus according to the invention.
Figure 4:
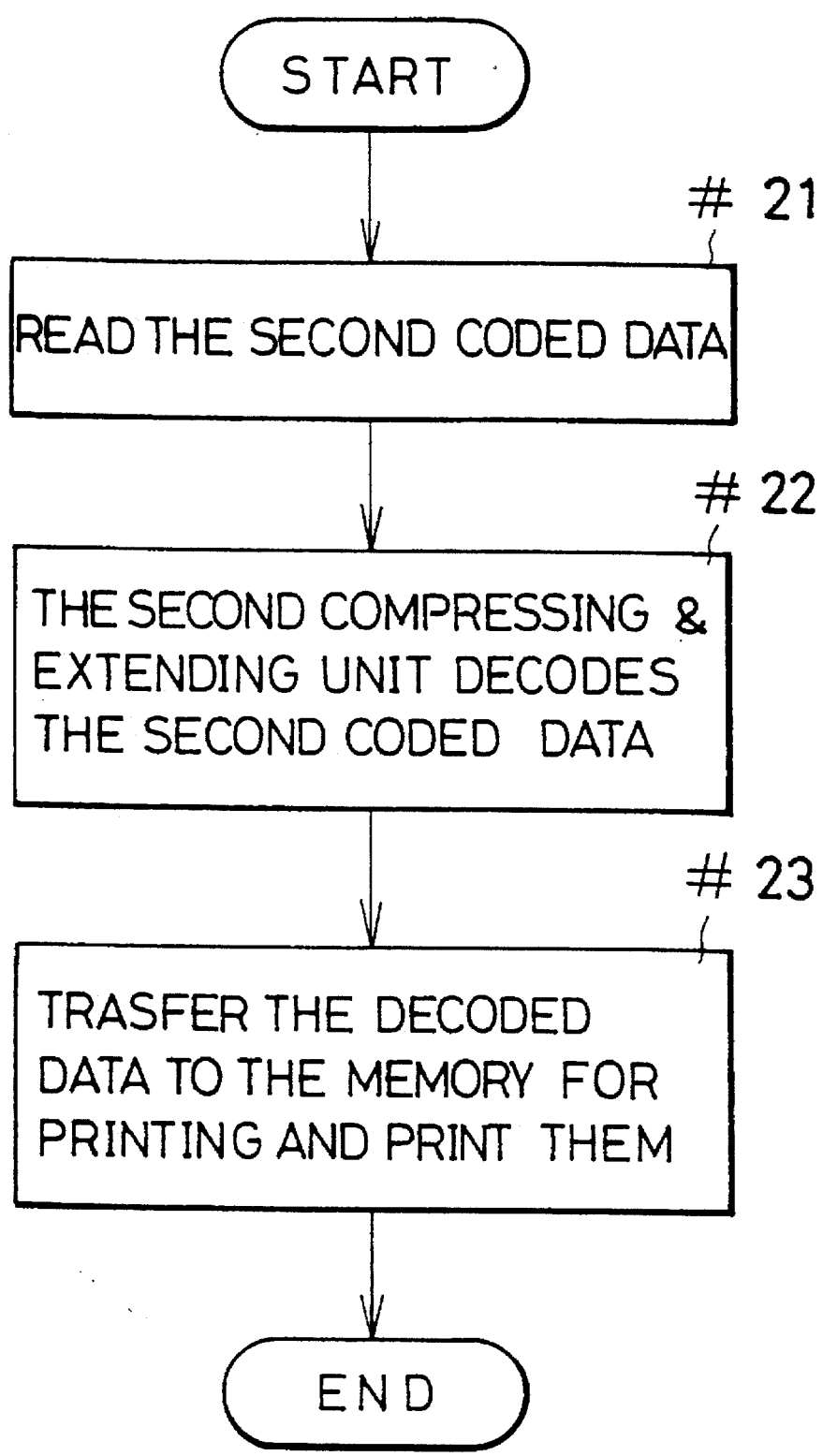
FIG. 4 shows a flowchart diagram representing a flow of a main process upon the extending operation for printing according to the invention.

In this embodiment, the compressing operation using the plural methods is performed (see FIG. 2) and the extending operation is performed on the compressed image data with these methods (see FIGS. 3 and 4).

Next, the description will be directed to these compressing and extending operations referring to FIGS. 2 to 4.

FIG. 2 is a flowchart diagram representing a flow of a main process upon the compression in the image filing device according to the invention. In the figure, symbols #1–#3 show steps of the flow.

In the step #1, image data, which are read by the optical reading device 1, are stored in the memory 3.

In the next step #2, the stored image data are coded by the first compressing and extending unit 8 with one method which is suitable for an image display unit such the CRT 7, for example the DCT method, and then the coded data, which will be referred as first coded data, are stored in the storing unit such as an optical disk.

In the step #3, the stored image data are coded by the second compressing and extending unit 9 with one method which is suitable for the printing device 8, generally the Huffman coding method, and then the coded data, which will be referred as second coded data, are stored in the storing unit such as an optical disk.

In the aforementioned steps #1–#3, both the former compressed data, or the first coded data available for an image display unit such the CRT 7 and the latter compressed data, or the second coded data available for the printing device 2 are stored in the optical disk of the optical disk drive device 12.

Next, the description will be directed to the extending operation for display.

FIG. 3 is a flowchart diagram representing a flow of a main process upon the extending operation for display in the filing apparatus according to the invention. In the figure, symbols #11–#13 show steps of the flow.

In the step #11, the first coded data are read out of the storing region of the optical disk or the like. The coded data are decoded by the first compressing and extending unit 8 in the step #12. In the next step #13, the decoded data are transferred to the memory for display 6 and thereby displayed by the display unit such as the CRT 7 or the like.

In the aforementioned steps #11–#13, the image data, which are compressed with one method suitable for a display unit like the CRT 7, for example the DCT method, are extended (or decoded) to derive data for display.

Thus, the image display unit in the form of a multi value system allows the displacement of a tone image and provides a display easy to see. In FIG. 1, the first compressing and extending unit 8 is adapted for an image display unit like the CRT 7.

The description will be directed to the extending operation for printing.

FIG. 4 shows a flowchart diagram representing a flow of a main process upon the extending operation for printing according to the invention. In the figure, symbols #21–#23 denote steps of the flow.

In the step #21, the second coded data are read out of the storing region of the optical disk or the like. The data are decoded by the second compressing and extending unit 9 in the step #22. In the next step #23, the decoded data are transferred to the memory (RAM) and then are printed by the printing device 2.

In the aforementioned processing of the steps #21–#23, the image data, which are compressed with one method suitable for the printing device 2, are extended (or decoded) to derive data for printing. In FIG. 1, the second compressing and extending unit 9 is adapted for a printing unit like the printing device 2.

Generally, the Huffman coding method is available for the printing device 2 because the binary method is widely used.

If the printing device 2 is in the form of the area tone method, the first compressing and extending unit 8 can be used upon the compressing and extending operations for the device 2.

In an example of a filing apparatus for moving pictures provided with a plurality of image processing units and a plurality of compressing and extending units corresponding to the image processing units, the similar constructions are provided.

Next, the description will be directed second embodiment of the filing apparatus according to the invention.

In this embodiment, the construction of the filing apparatus is similar to that of the first embodiment shown in FIG. 1. The extending operations for display and printing are similar to those of the first embodiment aforedescribed in FIGS. 3 and 4, but only the operations for data compressing are different from those of the first embodiment.

Figure 5:
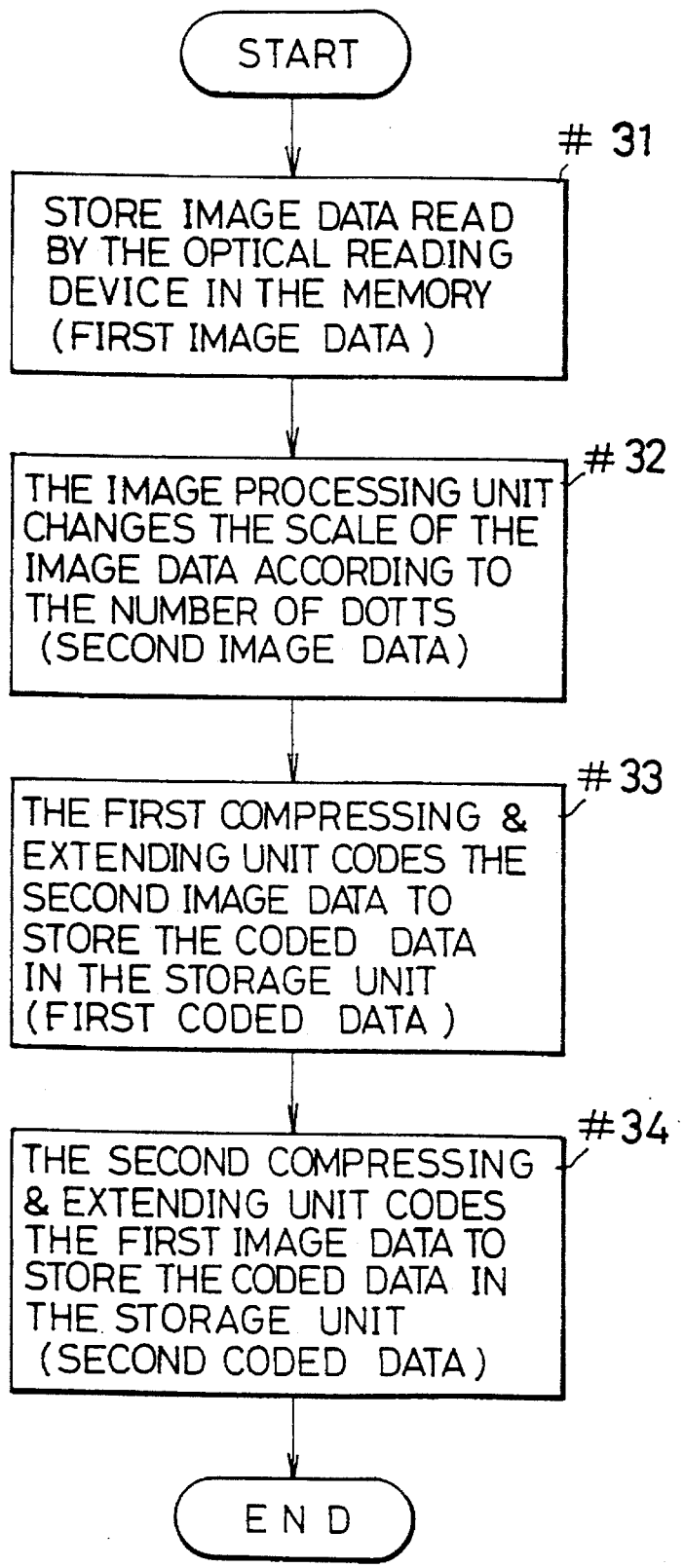
FIG. 5 shows a flowchart diagram representing a flow of a main process upon the data compressing operations having a process of changing the scale in the filing apparatus according to the second embodiment.

FIG. 5 shows a flowchart diagram representing a flow of a main process upon the data compressing operations having a process of changing the scale of an image in the filing apparatus according to the second embodiment. In the figure, symbols #31–#34 denote steps of the flow.

In the step #31, image data, which are read out of the optical reading device 1, are stored in the memory (RAM). The stored data will be referred as first image data. In the step #32, the scale of the first image data are modified by the image processing unit 10 in accordance with the number of pixels of the display unit, thereby the second image data are derived. In the step #33, the second image data are encoded by the first compressing and extending unit 8 and the coded data are stored as first coded data in the storing region of the optical disk or the like. In the next step #34, the first image data are encoded by the second compressing and extending unit 9 and the coded data are stored as second coded data in the storing region of the optical disk or the like.

In the aforementioned processing of the steps #31–#33, the scaling operation is performed in accordance with the number of pixels of the image display unit.

Next, the description will be directed to a third embodiment of the filing apparatus according to the invention.

In this embodiment, the basic construction is similar to that of the first embodiment shown in FIG. 1.

The apparatus according to the third embodiment is provided with a storing region in a RAM for storing an instruction input by an user with the keyboard 5 or the like. The instruction indicates one of compressing and extending methods available in the apparatus. That is, the keyboard 5 functions as a selecting means for selecting one of plural compressing and extending methods. The instruction input with the keyboard is stored in the RAM, and then the compressing and extending processes follow the instruction. Thus, this embodiment can allow an user to select a desirable compressing and extending method.

Next, the description will be directed to a fourth embodiment of the image filing apparatus according to the invention.

This embodiment is characterized in that there is provided with means for discriminating between types of original documents, that is means for determining types of original documents. When compressing image data, one of plural compressing methods is selected automatically using the discriminating means.

Figure 8:
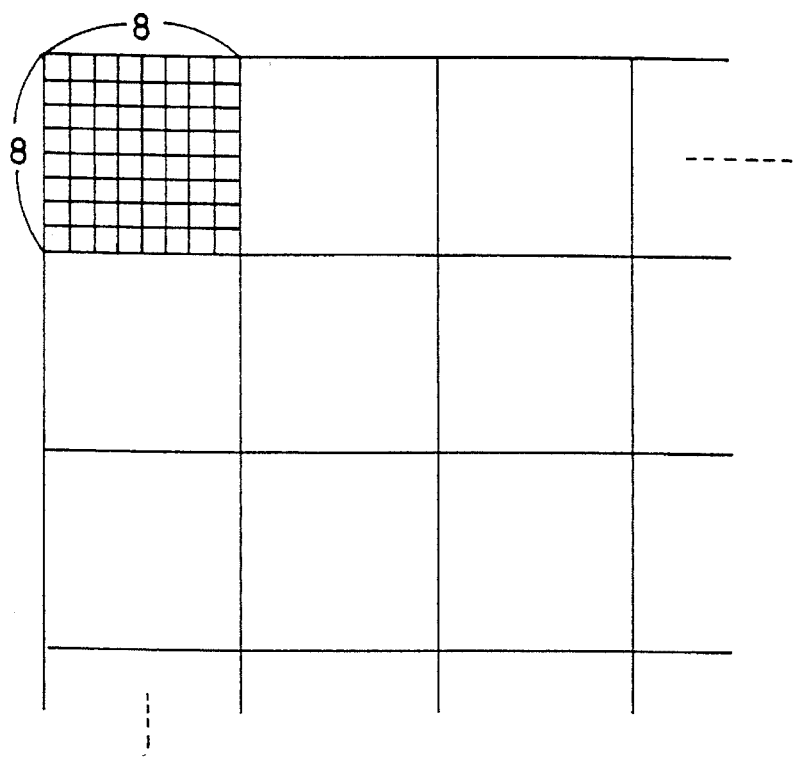
FIG. 8 shows pixel block in a case of dividing image information into a plurality of 8×8 pixel blocks.

FIG. 8 is a partially block diagram of the fourth embodiment of the image filing apparatus according to the invention. In this figure, the numeral number 21 denotes an image reading unit; 22, an encoding unit; 23, a decoding unit; 24, an image processing unit; 25, an image outputting unit; and 26, a code storage unit.

Original documents are read by the image reading unit 21 having a CCD (charge-coupled device) or the like. The read analog image data are encoded by the encoding unit 22 using the ADCT method. The detail construction of the encoding unit 22 will be described later. The encoded image data are stored in the code storage unit 26 which is constituted by a storage device such as a magnetic disk device or the like.

When reconstructing the corresponding images from the encoded data of the original documents, the encoded data are decoded by the decoding unit 23 to derive a signal of the reproduced image and the signal is output to the image processing unit 24.

In the image processing unit 24, the input signal of the reconstructed data is processed using an intermediate tone process and/or a simple binary process which may be selected before the processing. The processed data are output to the image outputting unit 25 such as a binary printer, a CRT or the like, for producing a hard copy and displaying the data on a display.

In this case, the image processing unit 24 uses magnitudes of decoded image data which are produced within the decoding process in the decoded unit 23 for the purpose of judging whether the encoded image has an intermediate tone image area.

Thus, the image filing apparatus determines whether encoded image data include an intermediate tone. Preferably, the discrimination is performed upon the filing and the results of the discrimination are stored as one file searching condition in a certain area of the optical disk. When searching a file, the corresponding result of the discrimination are displayed as one file searching condition on the display.

Figure 6:
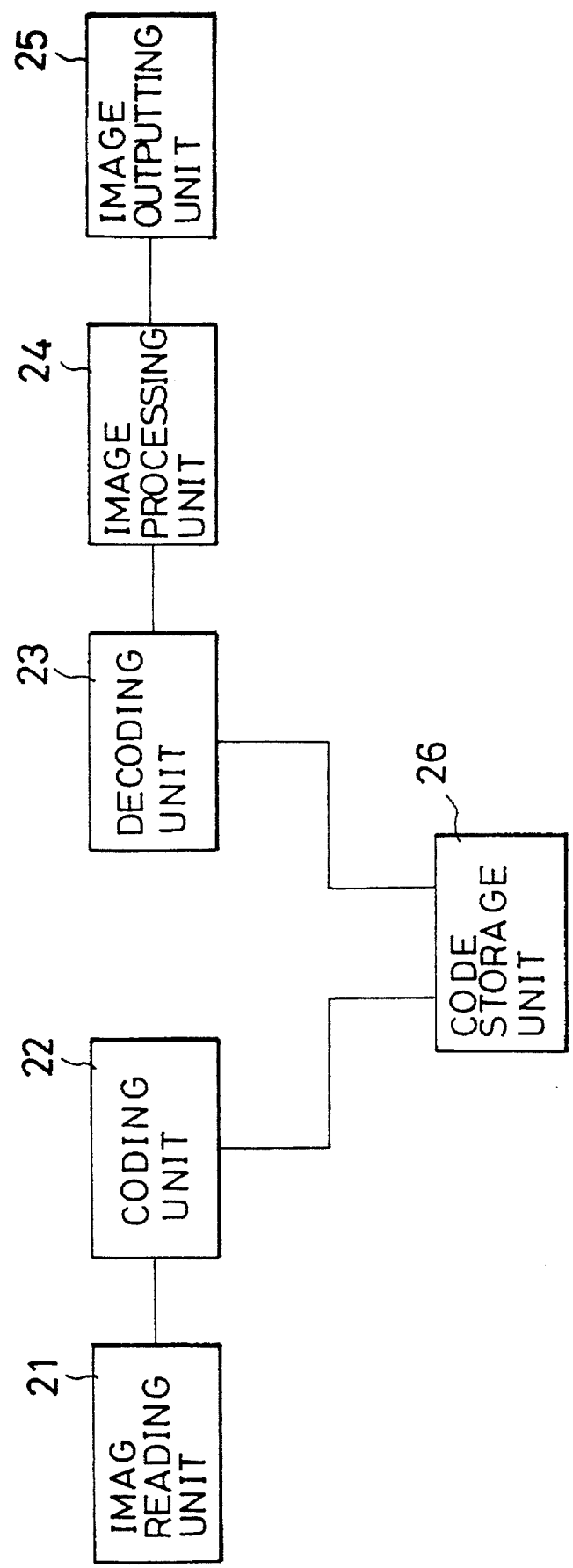
FIG. 6 is a partially block diagram of the fourth embodiment of the image filing apparatus according to the invention.

Next, the description will be directed to the detail construction and the operation of the encoding unit 22 and the decoding unit 23 shown in FIG. 6.

Figure 7:
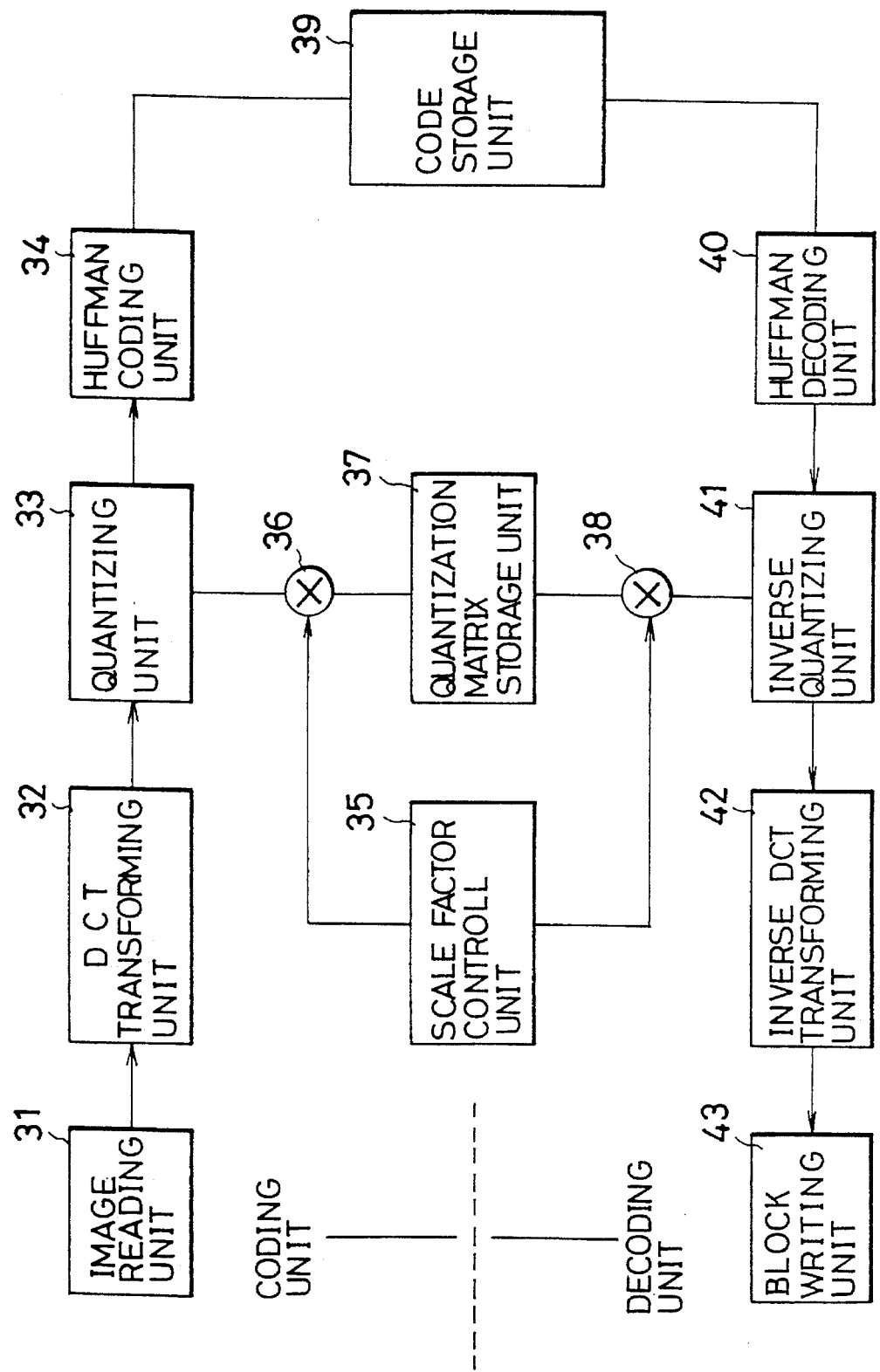
FIG. 7 is a partially block diagram of an example of the encoding unit and the decoding unit of the image filing apparatus according to the invention.

FIG. 7 is a partially block diagram of an example of the encoding unit and the decoding unit of the image filing apparatus according to the invention. In the figure, the numeral number 31 denotes a block reading unit; 32, a DCT transforming unit; 33, a quantizing unit; 34, a Huffman coding unit; 35, a scale factor control unit; 36, a first calculating unit; 37, a quantization matrix storage unit; 38, a second calculating unit; 39, a code storage unit; 40, a Huffman decoding unit; 41, a inverse quantizing unit; 42, a inverse DCT transforming unit; and 43, a block writing unit.

The description will be directed to the Discrete Cosine Transform (so-called DCT) coding.

In the coding process, image data are read out every N×N pixel block (for example, 8×8 pixel block) by the block reading unit 31, and then those block data are converted into DCT coefficients, respectively.

Now, an example of processing image data in 8×8 pixel blocks will be described.

FIG. 8 shows pixel blocks in the case of dividing image information into a plurality of 8×8 pixel blocks.

The image information is transformed into DCT coefficients every block as shown in FIG. 8. This DCT transformation is given by the following expression.

$$y_{uv} = \frac{2 \cdot C(u) \cdot C(v)}{N} \sum_{i=0}^{7} \sum_{j=0}^{7} X_{ij} \cdot \cos\left[\frac{(2i+1)u\pi}{2 \cdot N}\right] \cdot \cos\left[\frac{(2j+1)v\pi}{2 \cdot N}\right]$$

for u, v=0, 1, . . . , 7, where $x_{ij}$ denotes an original pixel's data; $Y_{uv}$, a coefficient for the discrete cosine transform; N=8; and $$C(u,v) = \begin{cases} \frac{1}{\sqrt{2}} & u, v = 0 \\ 1 & u, v = 1, 2, \ldots, 7 \end{cases}$$

The coefficient matrix are output from the DCT converting unit 32 to the quantizing unit 33. The coefficient matrix is linearized with quantization step sizes each having a different amount for each of the coefficients, and thereby quantization coefficients are derived. The first calculating unit 36 multiplies a quatization matrix stored in the quantization matrix storage unit 37 by a scale factor preset in the scale factor control unit 35 to derive those quantization step sizes corresponding to the coefficients, respectively.

Figure 9:
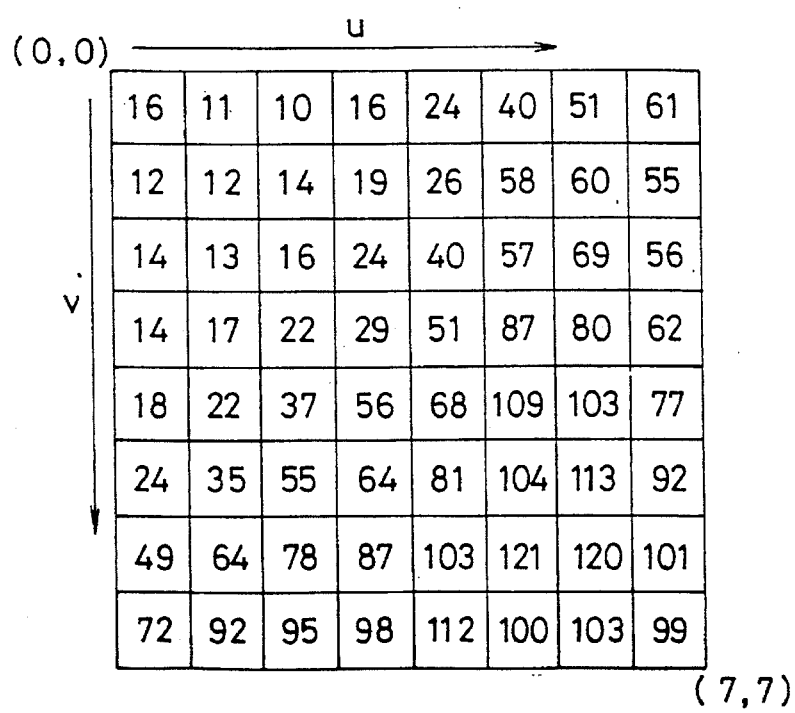
FIG. 9 shows an example of a quantization matrix.

FIG. 9 shows an example of a quantization matrix. The horizontal axis represents u in the aforedescribed equation and the vertical axis represents v in the figure. The quantization matrix is adapted to quantize coefficients in a lower order more quatization levels and code bits in accordance with the visual characteristics of human beings. A quantity of coding or a quality of a decoded image can be controlled by varying a value of the aforementioned scale factor.

Among the quantized coefficients, which are quantized by the quantizing unit 33, some of the coefficients with a higher frequency are allocated less code bits than the other coefficients with a lower frequency, thereby decreasing the total amount of coding. The quantized coefficients are stored in the code storage unit 39.

When outputting an image, that is, performing a decoding process, codes are read out of the code storage unit 39 and the read codes are delivered to the Huffman decoding unit 40. Each value corresponding to each of the quantized coefficients is assigned to each code in the Huffman decoding unit 40 and the value is inverse-quantized in the inverse-quantizing unit 41.

In this case, the second operation unit 38 computes a step size for quantization in this inverse-quatization by multiplying the quatization matrix stored in the quatization matrix storage unit 37 by the scale factor preset by the scale factor control unit 35.

The DCT coefficients output by the inverse quantization unit 41 are transformed to the corresponding image data in the inverse-DCT transforming unit 42 and then the image data are output every block by the block writing unit 43.

The image data, which are output in blocks, are stored temporally in one block line memory. The one block line memory can store a row of pixel blocks in the scanning direction. In this embodiment, the one block line memory is composed of 8 line memory areas corresponding to 8 lines in an image because one pixel block includes 8×8 pixels. The image data are output every one line to the image processing unit 24 in FIG. 6 when the one block line memory is fulfilled with one line of 8×8 pixel blocks.

The image processing unit performs a simple binary processing or an intermediate tone processing on the output image data in parallel to output the processed data to the image output unit 25.

Next, the description will be directed to a detail of the image processing unit 24 in FIG. 6.

Figure 10:
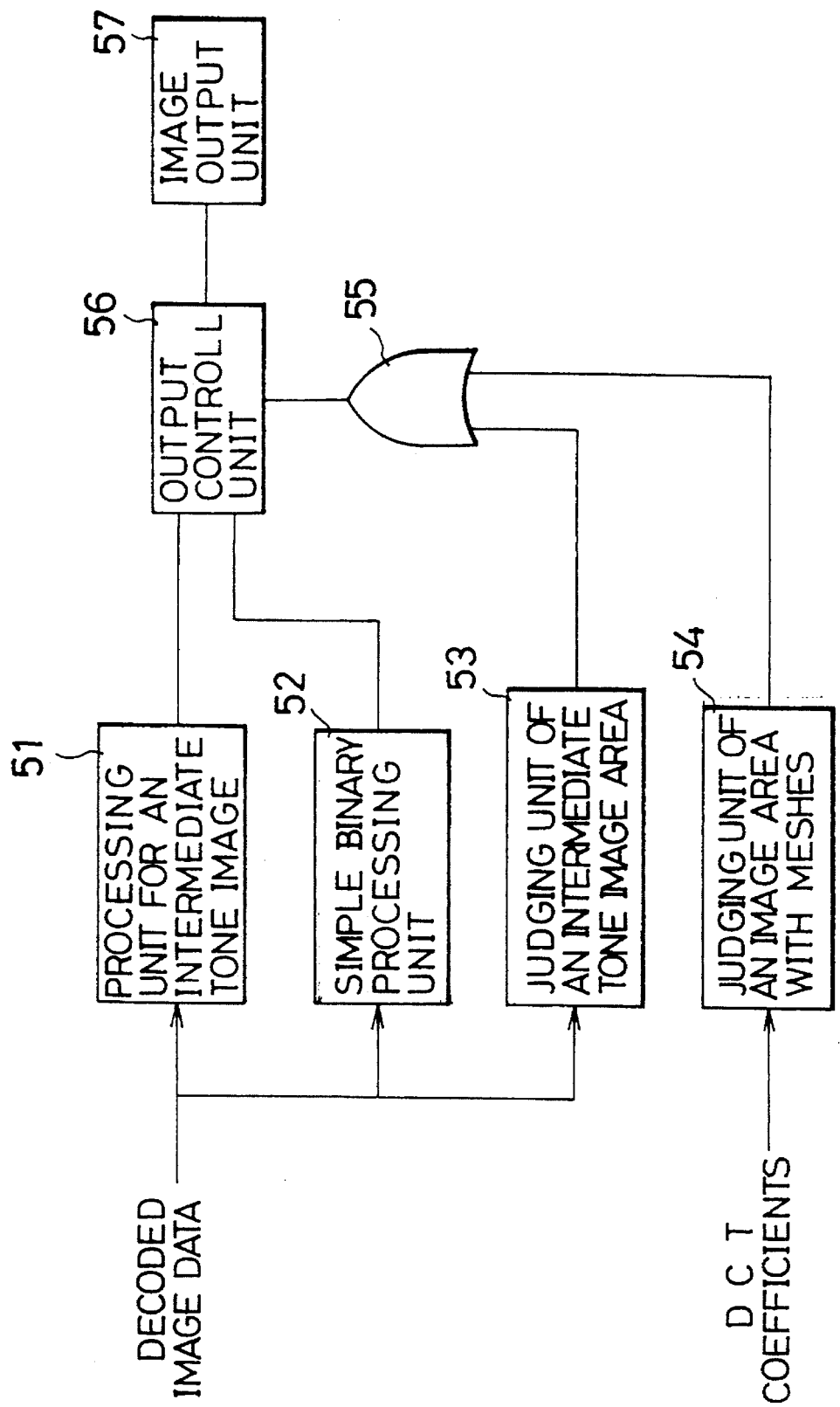
FIG. 10 is a block diagram of the image processing unit of the image filing apparatus according to the invention.

FIG. 10 is a block diagram of the image processing unit of the image filing apparatus according to the invention. In this figure, the reference numeral 51 denotes an intermediate tone processing unit; 52, a simple binary processing unit; 53, a judging unit for an intermediate tone image area; 54, a judging unit for an image area with meshes; 55, an OR gate circuit; 56, an output control unit; and 57, an image output unit.

As shown in FIG. 10, the image processing unit reads decoded image data and performs an intermediate tone process on the data in the intermediate tone processing unit thereof using the DTER method, the density pattern method, the submatrix method or the like and in parallel performs a simple binary process on the data in the binary processing unit 52 thereof.

The output control unit 56 selects either a signal from the intermediate tone processing unit 51 or a signal from the simple binary processing unit 52 in each area of the image by means of the output signal from the OR gate circuit 55 and outputs the selected one to the image output unit 57. The intermediate tone area judging unit 53 judges whether decoded image data in question have an intermediate tone area using the decoded image data and outputs a signal with "1" state when the data includes an intermediate tone area. The judging unit for an image area with meshes 54 judges whether the decoded image data have an meshes area and outputs a signal with "1" state when the judgment result is "yes". These signals are input to the OR gate circuit 55.

The output control unit 56 selects the output signal from the intermediate tone processing unit 51 when the output signal of the OR gate is "1" state and selects the output signal from the simple binary processing unit 52 except that.

A judging method of judging whether image data have an intermediate tone area is known (for example, Japanese Laid Open No. 61-146067 (KOKAI)). In this method, an AND operation is performed on an original signal representing decoded image data and the shifted signal delayed by plural pixels in the main scanning direction.

Next, the description will be directed to the conventional judging method.

Figure 11:
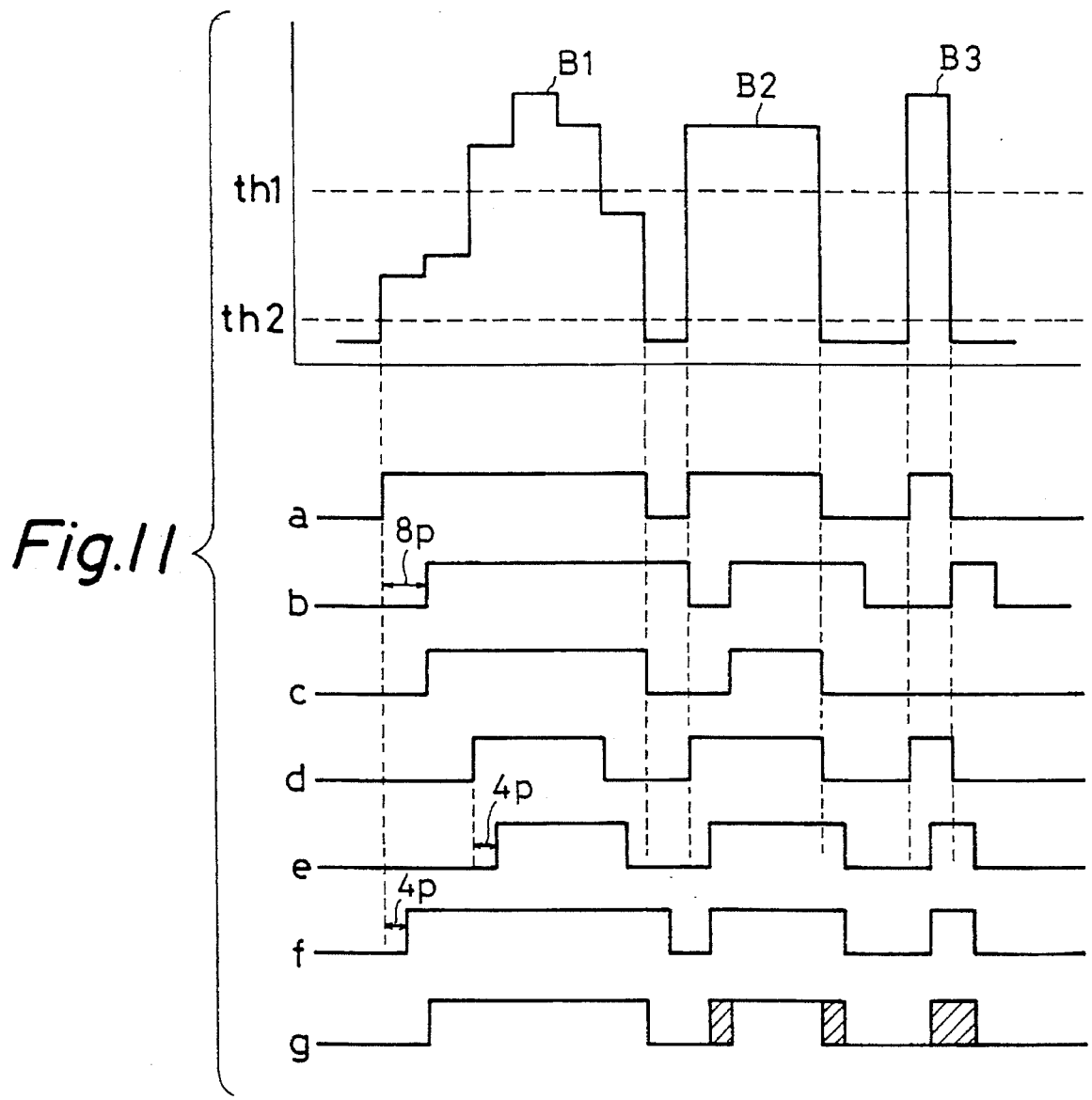
FIG. 11 is a timechart diagram of an example of the conventional judging method.

FIG. 11 is a timechart diagram of an example of the conventional judging method. In this figure, th1 on the vertical axis represents a threshold value for the simple binary processing; th2, a binary threshold value for the intermediate tone judging process. The symbols B1 represents an area with light and shade tone; B2, a thick line; and B3, a thin line. The symbols a–g show signals.

For example, information with respect to a digital image is obtained along the main scanning direction at a sub scanning position as shown in an upper part of FIG. 11. The digital image information is binarized with the threshold value th2 thereby to produce the signal shown with the symbol a in FIG. 11. The signal a is delayed by 8 pixels (8p) to derive the signal b. The AND operation is performed on the signals a and b thereby to produce the signal shown with the symbol c. This signal c is utilized for the judgment of the intermediate tone.

On the other hand, the simple binary processing unit 52 generates the signal d in FIG. 11 with the threshold value th1 for the binary processing. This signal d is delayed by 4 pixels (4 p) to derive the signal e. The timing of the signal e matches with the signal c for the intermediate tone judging. In addition, the intermediate tone processing unit 51 outputs the signal f delayed by 4 pixels (4 p) from the signal a, Meanwhile, it is difficult to illustrate a signal representing the intermediate tone, however, the signal f is provided in FIG. 11 to explain the intermediate tone processing in general. Either the signal e or the signal f is selected by the output control unit 56 with the signal c for the intermediate tone judgment to obtain the signal g in the FIG. 11.

In the signal g, the hatching parts represent the output signal by the simple binarizing process and the other parts represent the output signal by the intermediate tone process. The light and shade tone part B1 in the left side of FIG. 11 corresponds to a signal processed with the intermediate method and the thin line part B2 corresponds to a signal processed with the simple binarizing method.

On the other hand, the both side parts of the thick line part B2, which are in the central part of FIG. 11, correspond to a signal processed with the simple binarizing method and the other parts thereof correspond to a signal processed with the intermediate tone method.

Therefore, the conventional intermediate tone judging system can discriminate between characters and intermediate tone areas which are mixed in one image thereby to perform a preferable processing on each of them.

However, when an output of the output control unit 56 is selected, a signal output from the simple binarizing unit 52 is selected for an image area including meshes in the conventional system.

Such a disadvantage is dissolved by this embodiment in which the judging unit 54 for an image area with meshes and the OR gate circuit 55 are disposed. The judging unit 54 outputs a signal having "1" state in an area with meshes and having "0" state in another area. The signal are input to the OR gate circuit 55 together with the output signal from the intermediate tone judging unit 53. The result is that a signal output from the intermediate tone processing unit 51 can be selected for areas having meshes.

Next, the detail description will be directed to the judging unit 54 shown in FIG. 7.

Figure 12:
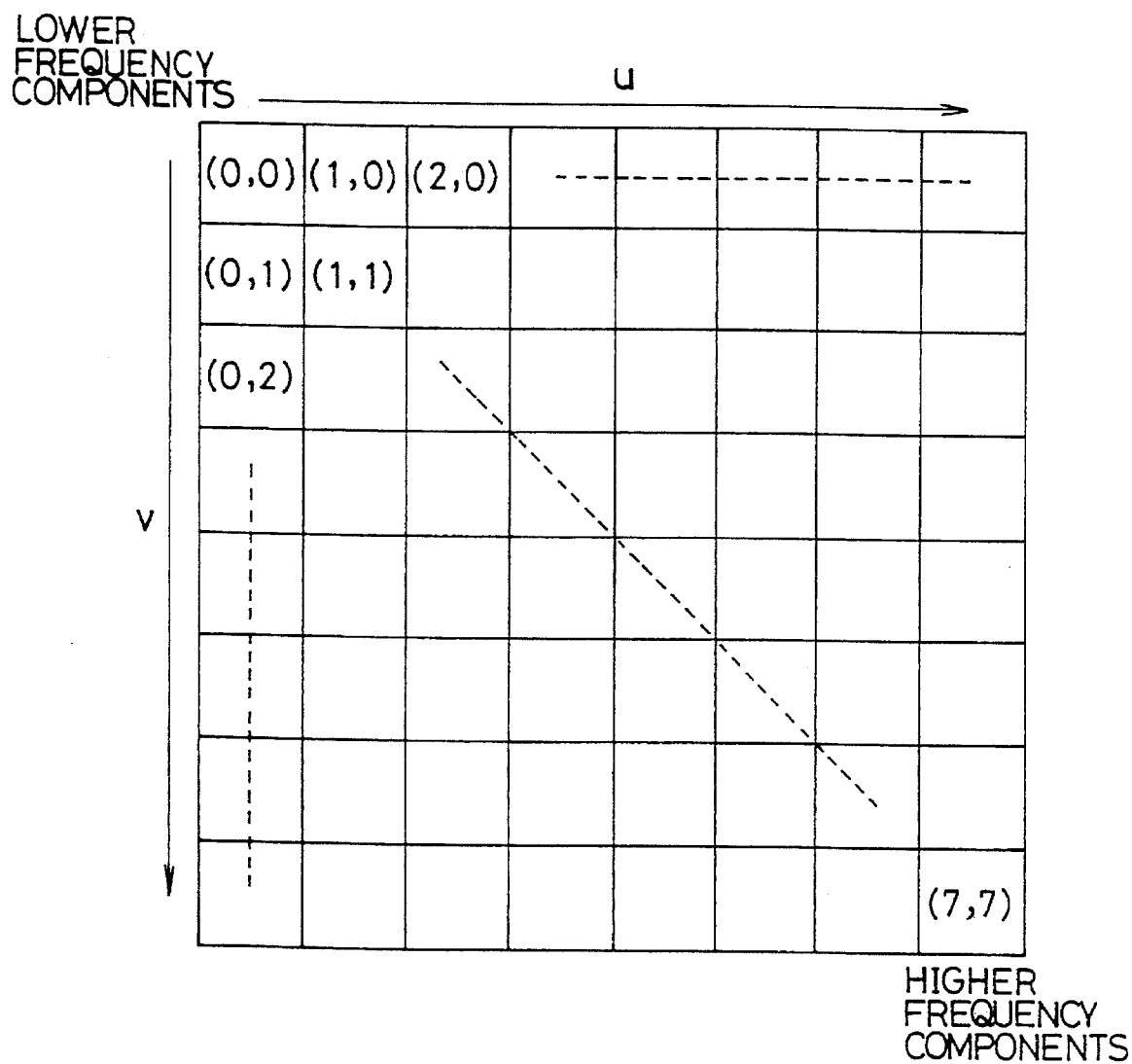

The judging unit 84 for an image area with meshes receives DCT coefficients output from the inverse quantizing unit 41 and judges whether an area of an image in question includes meshes on the basis of the DCT coefficients, FIG. 12 shows an example of DCT coefficients. The coefficient (0,0) in the upper left-hand corner of each block represents a mean density of the pixel block and coefficients in the lower order located adjacent to the coefficients (1, 0) and (0, 1) represent a rate of lower frequency components involved in the pixel block as shown in FIG. 12. On the other hand, coefficients in the higher order represent a rate of higher frequency components in the pixel block.

In view of the aforementioned relationship, the coefficient (0, 0) is called the DC component and the others are called the AC components. In addition, the coefficients (1, 0), (2, 0), (3, 0), . . . in the u direction (main scanning direction) represent a variation of densities in the main scanning direction. Similarly, the coefficients (0,1), (0,2), (0,3), . . . in the v direction (sub scanning direction) represent a variation of densities in the sub scanning direction. Further, the coefficients (1, 1), (2, 2), (3, 3), . . . in the oblique direction represent the magnitudes of the components where the variation of the density in the main scanning direction and the variation of the density in the sub scanning direction are superimposed.

Now, the description will be directed to an example of DCT coefficients. When the cosine transform operation is performed on pixel blocks as for an image including intermediate tone areas or characters to derive mean magnitudes of moduli of the AC components, respectively, the magnitudes of them are illustrated in FIG. 13.

FIG. 13a shows mean magnitudes as for an image including intermediate tone areas, FIG. 13b shows mean values as for an image including characters, FIG. 13c shows mean magnitudes as for an image including meshes of 100 lines which is read by a scanner with 400 dpi, and FIG. 13d shows mean values as for an image including meshes of 200 lines which is read by a scanner with 400 dpi.

As seen clearly from the comparison between FIG. 13a and FIG. 13b, they are different from each other with respect to the magnitudes of the higher frequency components, that is, the magnitudes of the character image are larger than those of the intermediate image, but both the magnitudes decrease gradually at a higher frequency. On the other hand, the magnitudes of DCT coefficients as for an image including meshes, which are obtained with the similar means, show specific patterns in which the magnitudes vary along both the main scanning and the sub scanning directions. For example, the peak of the magnitudes of AC components, which is emerged in the oblique direction of the matrix, is located in a position along the direction dependent on the frequency of meshes as shown in FIGS. 13c and 13d.

The filing apparatus according to the embodiment judges whether an area of an image includes meshes using this specific characteristic as for an image including meshes.

FIG. 14 shows relationship between a target block for the judgment and reference blocks. When judging whether the target block for the judgment is an image area including meshes, 5 blocks in the preceding line, 2 preceding blocks in the same line as the target block and 2 next blocks in the same line, that is a total of 9 reference blocks are also used. The mean magnitudes of the moduli of the AC components are obtained from those DCT coefficients in the target block and the nine reference blocks, respectively, and then it is judged whether there is a peak, which is located in the oblique direction of the matrix of the mean magnitudes, characteristic of an image with meshes.

FIG. 15 shows an example of divided areas of DCT coefficients in use for the judgment of an image area with meshes. In the figure, the symbols ①–⑤ denote the areas of DCT coefficients.

The five areas ①–⑤ are preset as shown in FIG. 15.

The coefficients (2, 2), (3, 2), (2, 3) and (3, 3) are involved in the first area ①. The coefficients (3, 3), (4, 3), (3, 4) and (4, 4) are involved in the second area ②. The coefficients (4, 4), (5, 4), (4, 5) and (5, 5) are involved in the third area ③. The coefficients (5, 5), (6, 5), (5, 6) and (6, 6) are involved in the fourth area ④. The coefficients (6, 6), (7, 6), (6, 7) and (7, 7) are involved in the fifth area ⑤.

As for each of the first to fifth areas ①–⑤, it is judged whether a peak emerges or not. That is, by comparison between the mean magnitude of coefficients in one of the areas ①–⑤ and those in the preceding coefficients each having a lower frequency, it is judged whether said one area has a peak or not.

Concretely, the mean magnitude of the area ① is compared with those of the coefficients (1, 1), (2, 1), (3, 1), (1, 2) and (1, 3). The mean magnitude of the area ② is compared with those of the coefficients (2, 2), (3, 2), (4, 2), (2, 3) and (2, 4). The mean magnitude of the area ③ is compared with those of the coefficients (3,3), (4,3), (5,3), (3,4) and (3,5). The mean magnitude of the area ④ is compared with those of the coefficients (4, 4), (5, 4), (6, 4), (4, 5) and (4, 6). The mean magnitude of the area ⑤ is compared with those of the coefficients (5, 5), (6, 5), (7, 5), (5, 6) and (5, 7). Then, as for one of the areas, if the corresponding mean magnitudes of the preceding coefficients are smaller than those of the area in question, it is concluded that the target block includes a meshes image.

FIG. 16 shows a partially block diagram of an example of the judging unit 54 for an image area with meshes. In the figure, the reference numeral 61 denotes a two-blocks line memory; 62, a mean magnitude processing unit; 63, a judging unit; and 64, an one-block line memory.

In FIG. 9, the DCT coefficient data, which are inverse quantized and reproduced, are stored temporally in the two-blocks line memory 61. Then, the DCT coefficients of one pixel block which is a target block for the judgment and the DCT coefficients of the other reference blocks in the relationship with the target block as shown in FIG. 14 are read out and output serially to the mean magnitude processing unit 62.

The mean magnitude processing unit 62 outputs the 8×8 pixel block each element of which is a mean magnitude of the moduli of the corresponding coefficients of the reference blocks and the target block for the judgment. The judging unit 63 judges whether any one of the areas ①–⑤ in the 8×8 pixel block includes the peak or not from the aforementioned operation. When it is concluded from the judgment that one of the areas includes the peak, the judging unit 63 outputs the signal with "1" state for the 8×8 pixel block, whereas the judging unit 63 outputs the signal with "0" state for the 8×8 pixel block when any one of the areas includes no peak.

The output signal with "1" state or "0" state is stored in the next one-block line memory 84. The one-block line memory 64 of the judging unit 54 for an image area with meshes outputs the signal with "1" state or "0" state every one line in synchronism with the signal output by the judging unit 53 for an intermediate tone image area shown in FIG. 10. Then, those signals are input to the OR gate circuit 55 and processed therein to supply the processed signal to the output control unit 56. Therefore, when an area of an image including meshes or intermediate tone is processed, the processed signal with the intermediate tone method is selected by the output control unit 56 and output to the image output unit. Thus, the judging signal for an image area, which indicates that an image area includes meshes and represents one characteristic of image information, is obtained.

Another example of the judging method, by which the meshes area judging unit 54 judges whether an area of an image includes a peak of DCT coefficients characteristic of meshes and located in the oblique direction of the matrix, will be described hereinafter.

FIG. 17 shows an example of a scanning method in use for the judgment of a peak located in the oblique direction of a matrix in the judging unit 54 for an image area with meshes. In the figure, the symbols ③–⑧ denote column's number and row's number.

As for mean magnitudes of moduli of the AC components of DCT coefficients in a target block for the judgment, scanning horizontally and vertically the mean magnitudes in the 8×8 pixel block from the third column and the third row as shown in FIG. 17 searches an element which satisfies such a condition that the element is located in the oblique direction of the matrix, and the magnitude is larger than 1.5 times the magnitude of the preceding element at the same column and than 1.5 times the magnitude of the preceding element at the same row. If such an element is present, it is concluded that there is a peak in the oblique direction of the matrix.

FIG. 18a shows the mean magnitudes arranged in the third line of the u direction of FIG. 13c and FIG. 18b shows the mean magnitudes arranged in the third line of the v direction.

For example, when the judgment is performed on the case of FIG. 13c using this method, it is clear that there is a peak at the third row and the third column as seen from FIG. 18 in which the magnitudes are arranged in the third line of the u direction and arranged in the third line of the v direction. The magnitude in the third element in the third line of the u direction is larger than that of the preceding element in the same line and the magnitude in the third element in the third line of the v direction is larger than that of the preceding element in the same line.

Therefore, it is concluded that the image area having such a peak includes meshes.

In a preferred embodiment, another judging method is available. FIG. 19 shows another example of a scanning method in use for the judgment of a peak located in the oblique direction of the matrix in the judging unit 54 for an image area with meshes.

As for mean magnitudes of moduli of the AC components of DCT coefficients in a target block for the judgment, scanning obliquely the mean magnitudes in the 8×8 pixel block from the third column and the third row as shown in FIG. 19 searches an element which satisfies such a condition that the magnitude is larger than 1.5 times the magnitude of the preceding element. If such an element is present, it is concluded that there is a peak at a diagonal element of the matrix.

FIG. 20 shows mean magnitudes of moduli of the AC components in the oblique direction of an array of DCT coefficients. In the figure, the symbols ①–⑧ denote the line number.

For example, when the judgment is performed on the case of FIG. 13c using this method, it is clear that there is a peak at the third row and the third column as seen from FIG. 20 in which the mean magnitudes are arranged in the oblique direction. The magnitude in the third diagonal element is larger than that of the preceding element. Therefore, it is concluded that the image area having such a peak includes meshes.

Thus, the judgment of areas having meshes is performed using the aforementioned judging method thereby to generate a judging signal representing whether an area in question includes meshes or not.

Since the apparatus according to the invention is provided with a means for determining a type of originals aforedescribed in detail with FIGS. 6 to 20, a compressing method suitable to the type of originals can be selected automatically through the judgment result by the determining means when compressing the originals. Concretely, an area for storing the judgment result is provided and the data representing the judgment result is referred, and thereby the desired compressing method is selected.

Many widely embodiments of the present invention may be constructed without departing from the spirit and the scope of the present invention is not limited to the specific embodiments described in the specification, except as defined in the appended claims.

What is claimed is:

1. An image filing apparatus comprising:

image reading means for reading an image;

a plurality of image data compressing and extending units, each of said plurality of image data compressing and extending units respectively corresponding to one of a plurality of image outputting units and being adapted to compress and extend image data read by said image reading means by a data compressing and extending method different from each other; and control means for selecting an image data compressing and extending unit from said plurality of image data compressing and extending units with respect to one of said plurality of image outputting units in accordance with an output form of said one of said plurality of image outputting units, and outputting the image data extended by the selected image data compressing and extending unit to said one of said plurality of image outputting units, wherein said apparatus further comprises images processing means for changing the scale of the image read by the image reading means in accordance with the number of dots in an image displaying unit, the image processing means changing the scale of the image before compression of the image data.

2. An image filing apparatus according to claim 1, wherein said control means comprises determining means for determining an image type of the image read by the image reading means using an array of DCT coefficients.

3. An image filing apparatus according to claim 2, wherein said determining means computes an N×N array of mean magnitudes of DCT coefficients in a plurality of N×N arrays of a target area and reference areas located adjacent to the target area of the image and thereby determining an image type of the target area of the image from a distribution of the mean magnitudes of elements in the computed N×N array.

4. An image filing apparatus according to claim 3, wherein when said distribution has a peak in a predetermined region of the array, said determining means determines that the target area of the image includes meshes.

5. An image filing apparatus according to claim 4, wherein when said distribution has a peak at a predetermined diagonal element of the array, said determining means conclude that the target area of the image includes meshes.

6. An image filing apparatus according to claim 3, wherein said control means selects the optimum image data compressing and extending unit on the basis of determining result of said determining means upon the compression of the image data.

7. An image filing apparatus according to claim 2, wherein said control means selects the image data compressing and extending unit on the basis of a determining result of said determining means upon the compression of the image data.

8. A method for filing images comprising the steps of:

reading an image;

providing a plurality of image data compressing and extending units, each of said plurality of image data compressing and extending units respectively corresponding to one of a plurality of image outputting units and being adapted to compress and extend image data by a data compressing and extending method different from each other;

selecting an image data compressing and extending unit from said plurality of image data compressing and extending units with respect to one of said plurality of image outputting units in accordance with an output form of said one of said plurality of image outputting units;

compressing and extending the image read in said reading step using the selected image data compressing and extending unit; and outputting the image data compressed and extended by the selected image data compressing and extending unit to said one of said plurality of image outputting units, wherein said method further comprises the step of changing the scale of the image data read in the reading step in accordance with the number of dots in an image displaying unit prior to said step of compressing and extending.

9. A method for filing images according to claim 8, wherein said step of selecting comprises the step of determining an image type of the image read in the reading step using an array of DCT coefficients.

10. A method for filing images according to claim 9, wherein said step of determining comprises computing an N×N array of mean magnitudes of DCT coefficients in a plurality of N×N arrays of a target area and reference areas located adjacent to the target area of the image and thereby determining an image type of the target area of the image from a distribution of the mean magnitudes of elements in the computed N×N array.

11. A method for filing images according to claim 10, wherein when said distribution has a peak in a predetermined region of the array, said determining step determines that the target area of the image includes meshes.

12. A method for filing images according to claim 11, wherein when said distribution has a peak at a predetermined diagonal element of the array, said determining step concludes that the target area of the image includes meshes.

13. A method for filing images according to claim 10, wherein said step of selecting an image data compressing and extending unit from said plurality of image data compressing and extending units is done on the basis of said step of determining upon the compression of the image data.

14. A method for filing images according to claim 9, wherein said step of selecting an image data compressing and extending unit from said plurality of image data compressing and extending units is done on the basis of said step of determining upon the compression of the image data.

* * * * *